W. P. WHEELER.
Distilling Apparatus.
No. 49,328.
Patented Aug. 8, 1865.
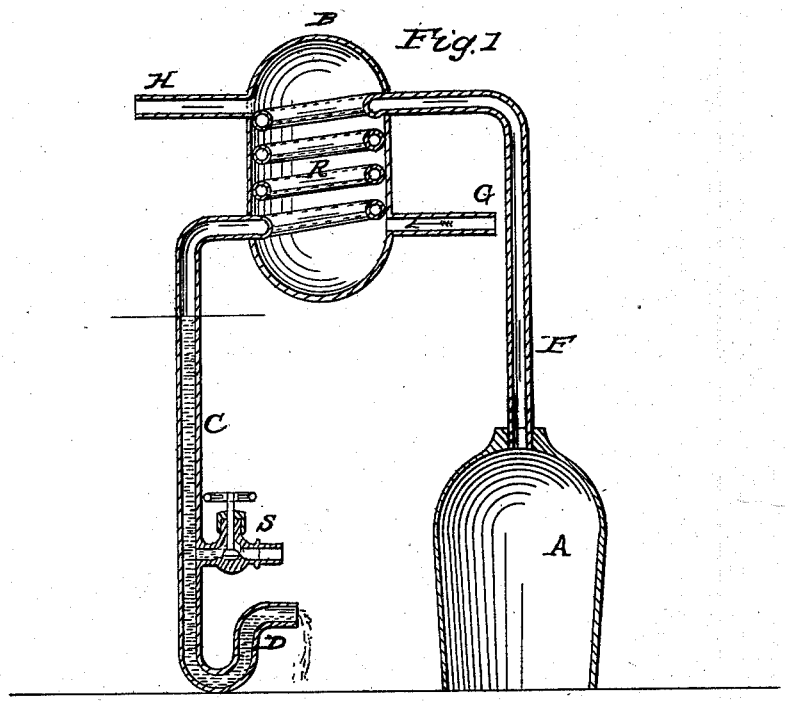
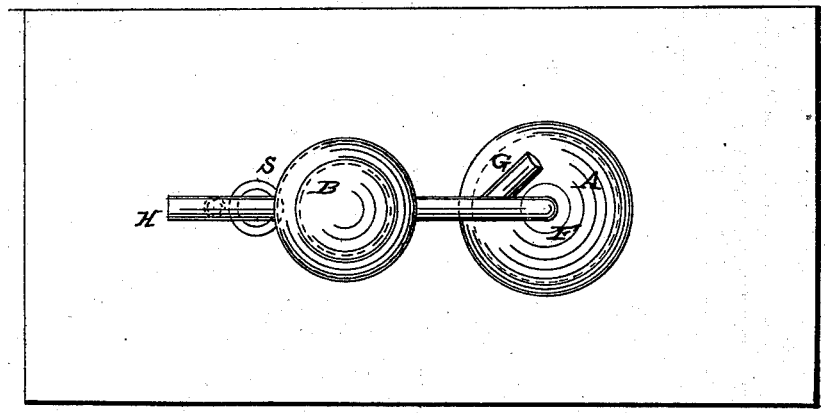

UNITED STATES PATENT OFFICE.

W. P. WHEELER, OF LOUISVILLE, KENTUCKY.

IMPROVEMENT IN EVAPORATING AND DISTILLING APPARATUS.

Specification forming part of Letters Patent No. 49,328, dated August 8, 1865.

*To all whom it may concern:*

Be it known that I, W. P. WHEELER, of Louisville, in the county of Jefferson and State of Kentucky, have invented a new and Improved Distilling, Evaporating, and Concentrating Apparatus; and I do hereby declare that the following is a full, clear, and exact description thereof, which will enable others skilled in the art to make and use the same, reference being had to the accompanying drawings, forming part of this specification, in which—

Figure 1 represents a longitudinal vertical central section of this invention. Fig. 2 is a plan or top view of the same.

Similar letters of reference indicate like parts.

This invention relates to an apparatus for evaporating, distilling, or concentrating, in which the operation is conducted under a more or less perfect vacuum, the pressure of the atmosphere being removed from the surface of the liquid to be concentrated or distilled by the gravity of the column of condensed liquid formed in the pipe, in which it accumulates as the same is discharged from the condenser until the pressure equals that of the atmosphere. By these means the distillation or evaporation is effected at a comparatively low temperature and mixed products are not likely to pass over.

A represents a still or evaporator made of copper or any other suitable material in any desired form or shape. This still connects by a pipe, F, with the coil R, which is situated in the condensing-vessel B. The coil R terminates in a pipe, C, which descends to a depth of thirty (more or less) feet, so that the column of liquid accumulating in the same up to a certain height, determined by its specific gravity and temperature, will produce a more or less perfect vacuum in the coil and in the upper part of pipe C and over the liquid to be operated upon. The coil R is surrounded by a stream of cold water or other cooling medium admitted to the condenser B through the pipe G and discharged through the pipe H.

A stop-cock, S, situated in the lower part of the pipe G, serves to discharge the air and impurities which would interfere with the vacuum before the commencement of operations.

By the action of the column of condensed liquid accumulating in the pipe C the atmospheric pressure is removed from the surface of the liquid to be evaporated or distilled, and the operation is effected at such a temperature, slightly advanced beyond the boiling-point, that mixed products are not likely to pass over, and that a nearly or quite pure product of uniform strength is obtained.

The length of the pipe C depends upon the specific gravity of the condensed liquid; but it must be taken long enough to produce a free discharge from and below the condenser. For alcoholic, saccharine, or other similar liquids of a specific gravity not much below that of water a pipe of thirty to forty feet length will be required.

It is obvious that this principle is applicable to evaporating, distilling, and concentrating apparatus of various construction; and I do not wish to confine myself, therefore, to the precise form or shape shown in the drawings, but reserve the right to change the same as circumstances may make desirable; and it must be further remarked that this apparatus is of peculiar advantage for concentrating or evaporating saccharine juices and for the distillation of alcohol and other liquids.

What I claim as new, and desire to secure by Letters Patent, is—

The vacuum-pipe C, or equivalent, with its lower end upturned or otherwise sealed from the entrance of the atmosphere, applied in combination with the condenser B and evaporator or still A, substantially as and for the purpose set forth.

W. P. WHEELER.

Witnesses:
J. W. SEATON,
W. JUDAH.